United States Patent [19]
Beermann et al.

[11] 3,929,874
[45] Dec. 30, 1975

[54] AMINOHYDROXYPOLYCARBOXYLIC ACID COMPOUNDS

[75] Inventors: Claus Beermann, Wildsachsen, Taunus; Volker Knittel, Wiesbaden; Walter Dürsch, Schneidhain, Taunus, all of Germany

[73] Assignee: Hoechst Aktiengesellschaft, Frankfurt, Germany

[22] Filed: Aug. 21, 1973

[21] Appl. No.: 390,321

[30] Foreign Application Priority Data
Aug. 22, 1972 Germany............................ 2241134

[52] U.S. Cl............. 260/534 M; 252/192; 252/193
[51] Int. Cl.².......................................... C07C 101/30
[58] Field of Search ................................ 260/534 M

[56] References Cited
UNITED STATES PATENTS
3,799,951  3/1974  Guthrie et al................. 260/534 M
FOREIGN PATENTS OR APPLICATIONS
1,176,151  8/1964  Germany............................ 260/534

OTHER PUBLICATIONS
Hauptmann et al., Chem. Abstracts, Vol. 57, (1962), pp. 16732–16733.
Campbell et al., Chem. Abstracts, Vol. 58, (1963), p. 10246.
Ohhashi et al., Chem. Abstracts, Vol. 68, (1968), p. 4863.
Noguchi et al., Chem. Abstracts, Vol. 76, (1972), p. 81.

*Primary Examiner*—James A. Patten
*Attorney, Agent, or Firm*—Connolly and Hutz

[57] ABSTRACT
A complexing agent for metal ions, preferably alkaline earth metal ions, which has the general formula III

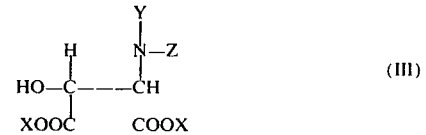

wherein Z is one of the groups $-CR_3R_4-COOX$

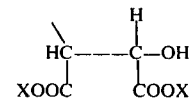

or

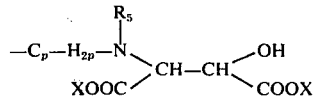

wherein, if Z stands for the group

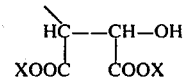

Y represents hydrogen or methyl and for all the other variants of Z, Y is hydrogen, methyl or lower alkyl or hydroxyalkyl and wherein X is hydrogen or an alkali metal and $R_3$ and $R_4$ independently from each other representing hydrogen, lower alkyl or hydroxyalkyl and $R_4$ furthermore representing the radical $-(CH_2)_m-COOX$, $m$ being 1 to 4 and X having the above meaning, $R_5$ representing hydrogen or methyl, and $p$ being 2 or 3, and a process for preparing it.

4 Claims, No Drawings

AMINOHYDROXYPOLYCARBOXYLIC ACID COMPOUNDS

It is known that stereo-isomeric hydroxyasparagic acids or the N-benzyl-derivatives thereof can be prepared by addition of ammonia or benzyl amine on cis- or trans-epoxy-succinic acids. However, these hydroxyasparagic acids do not show any marked binding capacity for alkaline earth ions.

It has now been found that novel compounds having a good complex-forming capacity for metal ions and especially alkaline earth metal ions are obtained, if one mole of a compound containing nitrogen corresponding to the general formula I

wherein $R^1$ stands for hydrogen or one of the groups $-CR_3R_4-COOX$ or $-C_pH_{2p}-NHR_5$, X being hydrogen or an alkali metal, preferably sodium or potassium and $R_3$ and $R_4$ representing independently from each other hydrogen, alkyl or hydroxyalkyl having 1 to 4 carbon atoms, preferably hydrogen or methyl, and $R_4$ furthermore representing the radical $-(CH_2)_m-COOX$, $m$ being 1 to 4 and X having the above meaning, $R_5$ representing hydrogen or methyl, and $p$ being 2 or 3, preferably 2, and wherein $R_2$ stands for hydrogen, methyl or the group $-CR_3R_4-COOX$ — $R_3$, $R_4$ and X having the above meaning — and, if $R_1$ represents the group $-CR_3R_4-COOX$, $R_2$ also stands for alkyl having 1 to 4 carbon atoms, preferably methyl, or hydroxylalkyl having 2 to 4 carbon atoms, preferably hydroxyethyl; is reacted with the n molar amount of a compound of the general formula II

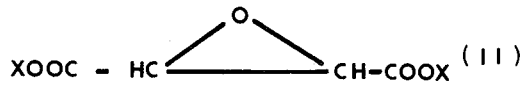

wherein X is as defined above, with the proviso that in the formula II at most one X stands for hydrogen, in which case n stands for values of from ½ to 2, if $R_1$ is hydrogen or $-C_pH_{2p}-NHR_5$ and of from ½ to 1 for the other meaning of $R_1$.

Furthermore, the invention relates to novel compounds obtained in the above-described reaction, having a good complexing capacity for metal ions, especially for alkaline earth metal ions, which correspond to the general formula III

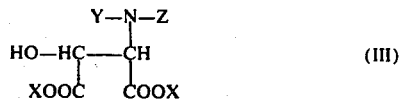

In this formula III Z represents one of the groups $-CR_3R_4-COOX$,

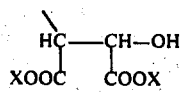

or

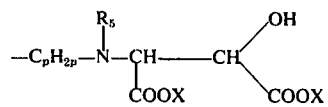

and if Z stands for the group

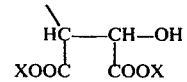

Y represents hydrogen or methyl, preferably hydrogen; for all the other variants of Z, Y represents hydrogen, methyl or alkyl or hydroxyalkyl having 2 to 4 carbon atoms; the radicals $R_3$, $R_4$, $R_5$, X and $p$ have the meanings given above.

The reaction of the compounds of the formula I with the epoxides of the formula II can be carried out at temperatures of from about 50 to 150°C. At temperatures above 100°C the use of autoclaves is necessary. The reaction times required, depending on the temperatures used, are between about 5 minutes and 8 days. In general, the reaction proceeds within about 1 to 12 hours. Water is the preferred solvent in the reaction of the amines of the formula I with the epoxides of the formula II. Mixtures of inert organic, water-miscible solvents and water, the water portion being at least about 40% by weight, can also be used. In the reaction pH-values of about 8 to 13, preferably between 9 and 11, are generally applied. As cations X sodium or potassium are preferably used. However, other alkaline metals or, for example, tertiary amines or quaternary ammonia hydroxides may also serve as proton acceptors.

The solutions obtained after the reaction in the aqueous medium can be used directly for the desired purpose.

However, the aqueous or water-containing solutions of the reaction products may also be freed from the solvent, for example by evaporation, if desired, under reduced pressure, or by spray-drying.

As epoxi compounds of the formula II used in the reaction may be considered the epoxidation products of the fumaric and preferably maleic acid or the alkali salts of these acids. The epoxidation products can be obtained according to known processes from the corresponding unsaturated compounds.

Suitable compounds containing nitrogen corresponding to the formula I, which have to be reacted with at least one mole of the epoxides of the formula II, are all aminocarboxylic acids of the general formula IV

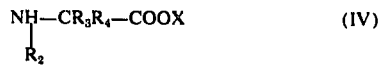

wherein $R_2$, $R_3$, $R_4$ and X have the meanings given above. Such aminocarboxylic acids are for example aminoacetic acid, sarcosine, C-hydroxymethyl-aminoacetic acid, N-hydroxyethylaminoacetic acid, α-alanine asparagic acid, glutamic acid, iminodiacetic acid, N-carboxymethyl-ethylene-diamine, N-carboxymethyl-1,3-propylene-diamine and other compounds, However, the nitrogen-containing substances of the formula I, in which $R_2$ is hydrogen or methyl and, at the same time, $R_1$ is hydrogen, or in which $R_1$ is a group $-C_pH_{2p}NHR_5$ have to be reacted with at least two moles of the epoxides of the formula II. Such nitrogen-containing substances are for example ammonia, methyl-amine, ethylene-diamine, 1,2-propylenediamine, 1,3-propylene-diamine, and the like. For economical reasons especially ammonia is used.

It is particularly surprising that the pure stereo-isomeric hydroxyasparagic acids already prepared and numerous other aminadducts on the epoxides of the formula II, which are not claimed herein, do not have any complex-forming properties for metals, whereas the compounds according to the invention have those properties. According to examinations the reason is probably to be found in the fact that the configuration of the formula V

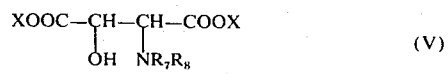 (V)

wherein $R_7$ and $R_8$ represent hydrogen, benzyl or alkyl radicals having 1 to 6 carbon atoms does not show any complexing properties, but that the structures of the formulae VI to VIII

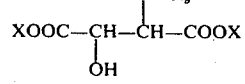
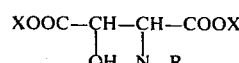 (VI)
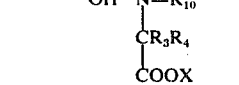

(VII),

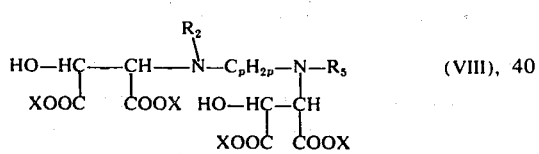 (VIII), in which $R_9$ represents hydrogen or methyl and $R_{10}$ is hydrogen, methyl or alkyl or hydroxyalkyl having 2 to 4 carbon atoms, have these properties.

The type VI is formed in the reaction of two moles of the epoxides of the formula II with 1 mole of ammonia or methyl amine. If $R_9$ were a longer alkyl or hydroxyalkyl radical, for example $-C_2H_5$ or $-C_2H_4OH$, the 2:1-adduct would practically not be formed for steric reasons, but only the ineffective 1:1-adduct V. The second mole of the epoxide mentioned of the formula II is reacted with water, while forming salts of dihydroxy-succinic acids. When about 0.7 to about 20 moles of ammonia or methyl amine react with 1 mole each of the epoxides of the formula II, reaction products are preferably obtained, which have a reduced tendency to complex-forming, with regard to the molar ratio of 0.5 : 1. Analysis shows that is these cases mixtures of the ineffective compounds V and the real complexing agents VI are concerned.

In the types of compounds VII the activity is limited to those products, in which the third carboxyl group is not too distant from the two other groups. Thus, for example, the 1:1-reaction product of the cis-epoxy-succinic acid with α-aminoacetic acid derivatives has a good carbon complexing capacity; the same applies to the reaction product of the α-aminopropionic acid, but already the addition product of the β-amino-propionic acid is ineffective. If, finally, one mole of a polyvalent primary or secondary amine without any carboxyl groups in the molecule is reacted with one mole of the epoxides of the formula II, it has to be supposed that the type of compound VIII contains the active principle, since only one addition of the epoxide of the formula II on a polyvalent amine free from carboxyl is not sufficient to form effective products. Such 1:1 — adducts can be obtained in rather a pure form only if an excess of at least one mole of the polyvalent amine is reacted with the epoxides of the formula II. Even in this case, the two hydroxy-succinic acid radicals in the type of compound VIII cannot have any distance desired from each other, since, for example, with ethylene-diamine and 1,3-propylene-diamine complexing agents are obtained, but not with 1,4-butylene-diamine or 1,6-hexamethylene-diamine.

The compounds of the invention represent a new type of complexing agents, which have in common the following structure element hitherto unknown: two carboxyl groups and one hydroxyl group are bound to nitrogen by means of only one ligand. Together with one or several other carboxyl groups not too distant, they form the complexing group of the formula IX

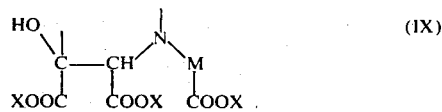 (IX)

as far as the starting compounds are those of the formula I with only one nitrogen atom.

In this formula M stands for the group $-CR_3R_4$ or

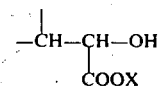

Thus, the compounds according to the invention are basically different from the complexing agents hitherto known, for example on the basis of nitrilo-triacetic acid; ethylenediamino-tetraacetic acid or hydroxyethylene-diamino-triacetic acid, in which compounds only one carboxyl group is linked to the basic nitrogen atom over a methylene radical, and an optionally present hydroxyethyl group also requires a ligand of its own of the nitrogen.

The products of the invention are suitable for complexing alkaline earth metal ions and, to a certain extent, heavy metal ions. Due to these properties they can be used for example, with a particular advantage, as so-called "builders" of detergents, rinsing agents, washing auxiliaries and cleaning agents. The compounds according to the invention of the formula III, particularly the corresponding sodium or potassium compounds, can be used individually or in combination with known builders.

Examples for those known builders are water-soluble inorganic alkali salts, for example alkali metal carbonates, alkali metal borates, -phosphates, polyphosphates, -silicates and -bicarbonates. In addition to these or other known inorganic builders may be used the known organic builders together with the compounds according to the invention. Such inorganic and organic builders are described for example in Schwartz, Perry, Berch, "Surface active agents and detergents," Vol. 2, 1958, pages 288 – 317.

Among these known products the phosphates, particularly the alkali tripolyphosphates and higher condensed phosphates are mostly used as builders. However, these phosphorus compounds show a number of disadvantages, when used in cleaning agents; thus they have a strong tendency to hydrolization, to give less condensated phosphorus compounds, for example orthophosphates, which are less suitable as builders and form undesired deposits in aqueous washing liquors. The products of the invention do not have this disadvantage.

Another advantage of the novel complexing agents according to the invention, as compared with the polyphosphates, is that they do not favor the eutrophication of the waters. Another advantage is that the new complexing agents are decomposed well in biological purification plants; better than for example the known complexing agents such as the alkali salts of the nitrilotriacetic acid or the ethylene-diamino-tetraacetic acid. A further advantage of the products of the formula III with regard to these well-known complexing agents is the relatively small heavy metal binding capacity. These last-mentioned properties, which are especially valuable for a practical use, are probably due to the additional presence of hydroxyl groups in addition to the carboxyl groups and the nitrogen atoms in the complexing agents.

In order to judge the complexing capacity of the compounds of the invention with alkaline earth metals, the calcium binding capacity has been determined by a potentiometric titration with the aid of electrode sensitive to calcium ions (producer: Orion Research Inc., USA). For this purpose the products have been titrated in a 0.2 % aqueous solution at a pH-value of 10 with a $10^{-1}$-molar calcium chloride solution.

The evaluation of the potential curves obtained shows the consumption of the titrating agent, from which the calcium binding capacity has been calculated in g calcium per 100 g of product.

The values determined in this way are listed in Table I for some Examples of the products of the invention. For comparison, the known complexing agents ethylene-diaminotetraacetic acid, sodium-tripolyphosphate and nitrilotriacetic acid (products 0 to 9) are also mentioned.

Table II contains reaction products not claimed herein, which have no or a very small efficiency.

The following Examples illustrate the invention.

EXAMPLES

General prescription for preparing the reaction products of 1 mole of the disodium salt of the cis-epoxy-succinic acid and n moles of the compounds of the formula

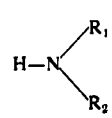 (1)

187 Grams (1 mole) of about 94 % cis-epoxy-succinic acid sodium obtained according to Example 1 of U.S. Pat. No. 3,156,709 and subsequently the number of moles of the compounds having the formula I indicated in Tables I and II were added to 500 g of water at room temperature. Aqueous solutions of the substances ammonia, methyl or ethylamine volatile at room temperature were introduced and the reaction vessel was closed. The mixture was refluxed, while stirring, for 4 to 5 hours, to 90°–95°C and the reaction mixture was dried in a rotation evaporator, at first in a water jet vacuum, then in an oil pump vacuum, until the weight was constant.

TABLE I reaction product of 1 mole of $$\text{NaOOC–CH}\overset{O}{\underset{}{\diagup\diagdown}}\text{CH–COONa}$$

with calcium binding capacity g of calcium/ 100 g of the reaction product

| | | |
|---|---|---|
| a) | 1 mole $H_2N$—$CH_2$—COONa | 14.0 |
| b) | 1 mole HN—$CH_2$—COONa<br>$\quad\quad\quad\mid$<br>$\quad\quad\quad CH_3$ | 14.0 |
| c) | 1 mole HN—$CH_2$—COONa<br>$\quad\quad\quad\mid$<br>$\quad\quad\quad C_2H_4OH$ | 12.7 |
| d) | 1 mole $H_2N$—CH—COONa<br>$\quad\quad\quad\quad\mid$<br>$\quad\quad\quad\quad CH_3$ | 13.4 |
| e) | 1 mole of $H_2N$—CH—COONa<br>$\quad\quad\quad\quad\quad\mid$<br>$\quad\quad\quad\quad\quad CH_2$—$CH_2COONa$ | 10.2 |
| f) | 1 mole of HN—$CH_2$—COONa<br>$\quad\quad\quad\quad\mid$<br>$\quad\quad\quad\quad CH_2$—COONa | 9.8 |
| g) | 0.28 mole of $NH_3$ | 6.4 |
| h) | 0.5 mole of $NH_3$ | 9.5 |
| i) | 1.1 mole of $NH_3$ | 6.8 |
| k) | 0.5 mole of $H_2N$—$CH_3$ | 6.8 |
| l) | 0.5 mole of $H_2N$—$CH_2$—$CH_2$—$NH_2$ | 10.0 |
| m) | 0.5 mole of $H_2$ N—$CH_2$—$CH_2$—$CH_2$—$NH_2$ | 8.5 |
| n) | 0.5 mole of $CH_3NH$—$C_2H_4$—NH—$CH_3$ | 7.2 |
| o) | sodium salt of ethylenediamino-tetraacetic acid | 10.9 |
| p) | sodiumtripolyphosphate | 10.7 |
| q) | sodium salt of nitrilotriacetic acid | 15.0 |

TABLE II reaction product of 1 mole of $$\text{NaOOC–CH}\overset{O}{\underset{}{\diagup\diagdown}}\text{CH–COONa}$$

with calcium binding capacity g of calcium/100 kg of reaction product

| | | |
|---|---|---|
| a) | 20 moles of $NH_3$ | 3.3 |
| b) | 0.55 mole of $H_2H$—$C_2H_5$ | 1.5 |
| c) | 0.55 mole of $H_2N$—$C_2H_4OH$ | 0 |
| d) | 0.5 mole of $H_2N$—$C_2H_4OH$<br>$\quad\quad\quad\quad\mid$<br>$\quad\quad\quad\quad CH_2OH$ | 0 |
| e) | 0.55 mole of $H_2N$—C—$C_2H_5$<br>$\quad\quad\quad\quad\quad\mid$<br>$\quad\quad\quad\quad\quad CH_2OH$ | 0 |
| f) | 0.55 mole of $H_2N$—$C_4H_9$ | 0 |
| g) | 1 mole of $H_2N$—$CH_2$—$C_6H_5$ | 0 |
| h) | 1 mole of $H_2N$—$CH_2$—$CH_2$—$CH_2$—$N(CH_3)_2$ | 0 |
| i) | 1 mole of $H_2N$—$CH_2$—$CH_2$—COONa | 0 |
| k) | 1 mole of $H_2N$—$C_3H_6$—COONa | 0 |
| l) | 1 mole of $H_2N$—$C_5H_{10}$—COONa | 0 |
| m) | 1 mole of $H_2N$—$C_2H_4$—$SO_3Na$ | 0 |
| n) | 0.5 mole of $H_2N$—$NH_2$ | 0 |
| o) | 5 mole of $H_2N$—$CH_2$—$CH_2NH_2$ | 1.7 |
| p) | 0.5 mole of $H_4N$—$C_4H_8$—$NH_2$ | 0 |
| q) | 0.5 mole of $H_2N$—$C_6H_{12}$—$NH_2$ | 0 |
| r) | 2 moles of $HN(CH_3)_2$ | 0 |
| s) | 0.5 mole of $NH\overset{CH_2-CH_2}{\underset{CH_2-CH_2}{\diagup\diagdown}}NH$ | 0 |

TABLE II-continued

| reaction product of 1 mole of | | calcium binding capacity g of calcium/100 kg of reaction product |
|---|---|---|
|  | with | |
| t) 1 mole of NH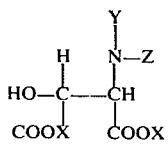 | | 0 |
| u) 1 mole of CH₃NH—C₂H₄—SO₃Na | | 0 |

We claim:
1. A compound of the formula

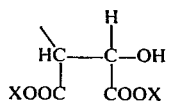 [(III)]

wherein Z is one of the groups —CR₃R₄—COOX,

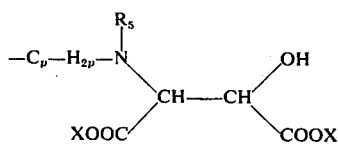

or

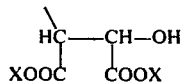

wherein, if Z stands for the group

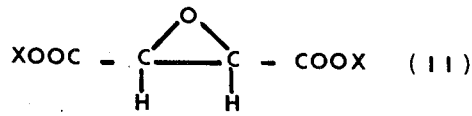

Y represents hydrogen or methyl, and for all the other variants of Z, Y is hydrogen, methyl or alkyl or hydroxyalkyl having 2 to 4 carbon atoms, and wherein X is hydrogen or an alkali metal, and $R_3$ and $R_4$ independently from each other representing hydrogen, alkyl or hydroxyalkyl having 1 to 4 carbon atoms, and $R_4$ furthermore representing the radical —(CH₂)$_m$—COOX, $m$ being 1 to 4 and X having the above meaning, $R_5$ representing hydrogen or methyl, and $p$ being 2 or 3.

2. A process for preparing compounds having a complexing capacity for metal ions, wherein one mole of a compound containing nitrogen corresponding to the formula I $$H-N\begin{matrix}R^1\\R^2\end{matrix} \qquad (I)$$

wherein $R^1$ stands for hydrogen or a group —CR₃-R₄—COOX or C$_p$H$_{2p}$—NHR₅, X being hydrogen or an alkali metal, and $R_3$ and $R_4$ representing independently from each other hydrogen, alkyl or hydroxyalkyl having 1 to 4 carbon atoms, and $R_4$ furthermore representing the radical —(CH₂)$_m$—COOX, $m$ being 1 to 4 and X having the above meaning, $R_5$ representing hydrogen or the methyl radical, and p being 2 or 3, and wherein $R_2$ stands for hydrogen, methyl, the group —CR₃-R₄—COOX, $R_3$, $R_4$ and X having the above meaning and, if $R_1$ represents the group —CR₃R₄—COOX, $R_2$ also stands for alkyl having 1 to 4 carbon atoms, or hydroxylalkyl having 2 to 4 carbon atoms, is reacted at a temperature of about 50°C to 150°C with the n molar amount of a compound of the formula II $$XOOC-C\overset{O}{\underset{H}{\diagup\diagdown}}C-COOX \qquad (II)$$

wherein X is as defined above, with the proviso that in the formula II at most one X stands for hydrogen and in which case n stands for values of from ½ to 2; if $R_1$ is hydrogen or —C$_p$H$_{2p}$—NHR₅, and of from ½ to 1 for the other meaning of $R_1$.

3. A process as claimed in claim 2, wherein the reaction is carried out at a temperature of about 50°C to 100°C in water or in a mixture of water with an inert organic solvent, the portion of water being at least 40% by weight.

4. A process as claimed in claim 2, wherein the reaction is carried out at a pH-value of about 8 to 13.

* * * * *